(12) United States Patent
Furukawa et al.

(10) Patent No.: US 10,515,053 B2
(45) Date of Patent: Dec. 24, 2019

(54) ELECTRONIC DEVICE AND DATABASE CONSTRUCTING METHOD

(71) Applicant: ALPINE ELECTRONICS, INC., Shinagawa-ku, Tokyo (JP)

(72) Inventors: Koji Furukawa, Iwaki (JP); Toru Marumoto, Iwaki (JP)

(73) Assignee: ALPINE ELECTRONICS, INC., Tokyo (JP)

(*) Notice: Subject to any disclaimer, the term of this patent is extended or adjusted under 35 U.S.C. 154(b) by 508 days.

(21) Appl. No.: 15/478,498

(22) Filed: Apr. 4, 2017

(65) Prior Publication Data
US 2017/0329795 A1 Nov. 16, 2017

(30) Foreign Application Priority Data
May 11, 2016 (JP) ................... 2016-095095

(51) Int. Cl.
*G06F 16/16* (2019.01)
*G06F 16/13* (2019.01)
*G06F 16/683* (2019.01)
*G06F 16/17* (2019.01)
*G06F 16/43* (2019.01)

(52) U.S. Cl.
CPC ............ *G06F 16/162* (2019.01); *G06F 16/13* (2019.01); *G06F 16/1727* (2019.01); *G06F 16/43* (2019.01); *G06F 16/683* (2019.01)

(58) Field of Classification Search
CPC . G06F 16/262; G06F 16/1727; G06F 16/1737
See application file for complete search history.

(56) References Cited

U.S. PATENT DOCUMENTS

| 2002/0065841 | A1* | 5/2002 | Matsuda | ................ G11B 20/10 |
| 2004/0086120 | A1* | 5/2004 | Akins, III | ............ G11B 27/034 380/240 |
| 2004/0107236 | A1* | 6/2004 | Nakagawa | ............ G06F 16/275 709/200 |
| 2008/0077550 | A1 | 3/2008 | Shike | |
| 2009/0187578 | A1 | 7/2009 | Morita | |
| 2012/0011340 | A1* | 1/2012 | Flynn | ................. G06F 12/0246 711/171 |

(Continued)

FOREIGN PATENT DOCUMENTS

| JP | 2008-083914 | 4/2008 |
| JP | 2009-175808 | 8/2009 |

*Primary Examiner* — Robert W Beausoliel, Jr.
*Assistant Examiner* — Nirav K Khakhar
(74) *Attorney, Agent, or Firm* — Brinks Gilson & Lione

(57) ABSTRACT

A method of constructing a database in an on-vehicle device includes the steps of connecting a mobile terminal storing a plurality of pieces of music and music information associated with each of the plurality of pieces of music, acquiring the music information of each piece of music from the mobile terminal, when the acquired music information is stored in a storage space, determining whether free capacity of the storage space is insufficient, and when it is determined that the free capacity of the storage space is insufficient, removing at least one piece of music information of each piece of music from the storage space, and constructing a database for searching music on the basis of the music information stored in the storage space.

18 Claims, 15 Drawing Sheets

(56) References Cited

U.S. PATENT DOCUMENTS

| | | | |
|---|---|---|---|
| 2014/0047350 A1* | 2/2014 | Kim | G06F 16/44 |
| | | | 715/739 |
| 2017/0371922 A1* | 12/2017 | Warrier | G06F 16/245 |
| 2018/0146059 A1* | 5/2018 | Schoenberg | H04L 43/16 |

* cited by examiner

FIG. 11A

| IDENTIFICATION | MUSIC TITLE | ARTIST'S NAME | ALBUM TITLE | GENRE | COMPOSER'S NAME |
|---|---|---|---|---|---|
| ID#1 | AAA | Art_A | ALB_A | Pop | A |
| ID#2 | BBB | Art_B | ALB_B | Rock | B |
| ... | ... | ... | ... | ... | ... |
| ID#n | NNN | Art_N | ALB_N | Pop | N |

TRACK INFORMATION: IDENTIFICATION, MUSIC TITLE
PARTICULAR TYPE INFORMATION: ARTIST'S NAME, ALBUM TITLE, GENRE, COMPOSER'S NAME

FIG. 11B

| IDENTIFICATION | MUSIC TITLE | ARTIST'S NAME | ALBUM TITLE | GENRE | COMPOSER'S NAME (REMOVED) |
|---|---|---|---|---|---|
| ID#1 | AAA | Art_A | ALB_A | Pop | A |
| ID#2 | BBB | Art_B | ALB_B | Rock | B |
| ... | ... | ... | ... | ... | ... |
| ID#n | NNN | Art_N | ALB_N | Pop | N |

FIG. 11C

| IDENTIFICATION | MUSIC TITLE | ARTIST'S NAME | ALBUM TITLE (REMOVED) | GENRE | COMPOSER'S NAME (REMOVED) |
|---|---|---|---|---|---|
| ID#1 | AAA | Art_A | ALB_A | Pop | A |
| ID#2 | BBB | Art_B | ALB_B | Rock | B |
| ... | ... | ... | ... | ... | ... |
| ID#n | NNN | Art_N | ALB_N | Pop | N |

FIG. 12A

| IDENTIFICATION | MUSIC TITLE | ARTIST'S NAME | ALBUM TITLE | GENRE | COMPOSER'S NAME |
|---|---|---|---|---|---|
| ID#1 | AAA | Art_A | ALB_A | Pop | A |
| ID#2 | BBB | Art_B | ALB_B | Rock | B |
| ID#3 | CCC | Art_C | ALB_C | Rock | C |
| ID#4 | DDD | Art_D | ALB_D | Pop | D |

FIG. 12B

| IDENTIFICATION | MUSIC TITLE | ARTIST'S NAME | ALBUM TITLE | GENRE | COMPOSER'S NAME |
|---|---|---|---|---|---|
| ID#1 | AAA | Art_A | ALB_A | Pop | A |
| ID#2 | BBB | Art_B | ALB_B | Rock | B |
| ID#3 | CCC | Art_C | ALB_C | Rock | C |
| ID#4 | DDD | Art_D | ALB_D | Pop | D |

FIG. 13A

| | MUSIC SEARCH | ✕ |
|---|---|---|
| | ARTIST'S NAME | > |
| | ALBUM TITLE | > |
| | MUSIC TITLE | > |
| | GENRE | > |
| | COMPOSER'S NAME | > |
| | PODCAST | > |
| | PLAYLIST | > |

FIG. 13B

| | MUSIC SEARCH | ✕ |
|---|---|---|
| | ARTIST'S NAME | > |
| | ALBUM TITLE | > |
| | MUSIC TITLE | > |
| | ~~GENRE~~ | > |
| | ~~COMPOSER'S NAME~~ | > |
| | PODCAST | > |
| | PLAYLIST | > |

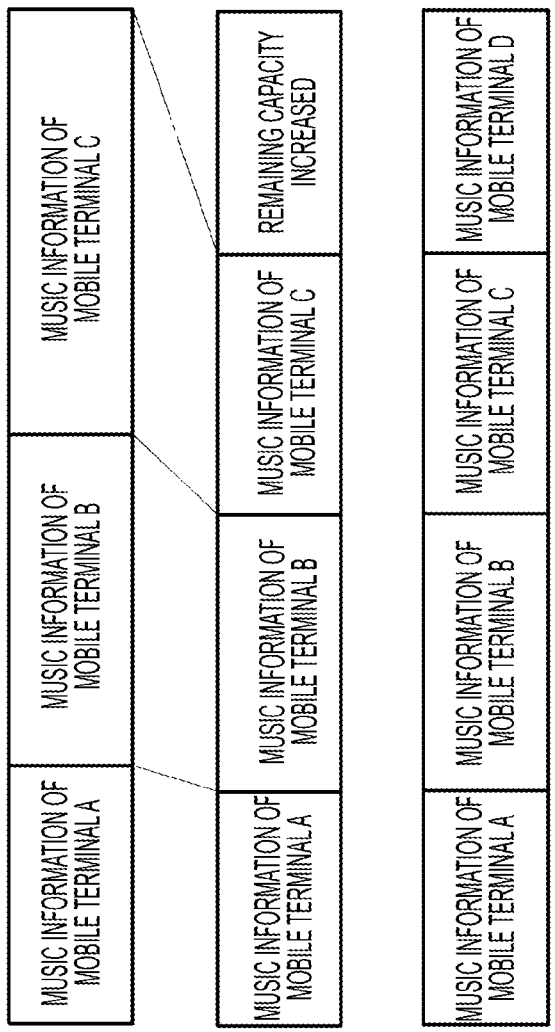

ELECTRONIC DEVICE AND DATABASE CONSTRUCTING METHOD

RELATED APPLICATION

The present application claims priority to Japanese Patent Application Number 2016-095095, filed May 11, 2016, the entirety of which is hereby incorporated by reference.

BACKGROUND

1. Field of the Invention

The present invention relates to an electronic device that can be connected to a mobile terminal that stores a plurality of pieces of content and attribute information associated with each of the plurality of pieces of content, and more particularly to construction of a database for searching a plurality of pieces of content of a mobile terminal.

2. Description of the Related Art

With the widespread use of multifunctional mobile terminals typified by smartphones, systems in which a smartphone is linked up with an on-vehicle device, e.g., a navigation system, have been in practical use. For example, the communication function of a smartphone is used to acquire useful road traffic information from a server or the like that is connected to an external network, and functions contained in a smartphone can be used with an on-vehicle device.

For example, JP 2008-83914 A discloses an on-vehicle device that extracts search information from an external medium and creates a temporary database on the basis of the search information. JP 2009-175808 A discloses a device that allows a user to select whether to transfer content to the extent possible until the capacity of a content storage device becomes full when the free capacity of the content storage device is insufficient.

SUMMARY

A smartphone stores, for example, music and music information associated with the music (for example, music title, artist's name, album title, genre, and composer's name) in an embedded storage. In searching or reproducing music of the connected smartphone with an on-vehicle device, the on-vehicle device is in some cases required to comply with a protocol with respect to the smartphone.

FIG. 1A is a diagram illustrating an example of an on-vehicle system in which music stored in a smartphone is searched with a conventional on-vehicle device. When a smartphone 20 is connected to an on-vehicle device 10, the music search function of the smartphone 20 is enabled in the on-vehicle device 10 (S10). For example, when the selection of a track list is input from a user, the on-vehicle device 10 requests music information of all tracks to the smartphone 20. The music information is attribute information or metadata associated with the music, which is content. The smartphone 20, in response to the request, searches music information in a database region of an embedded storage 22 and notifies the on-vehicle device 10 of the music information of all the searched tracks. The on-vehicle device 10 displays a list of all tracks on the basis of the notified music information (S20).

In the on-vehicle system illustrated in FIG. 1A, the smartphone 20 has a function to search music of the embedded storage 22 in response to a request from the on-vehicle device 10, while in the on-vehicle system illustrated in FIG. 1B, the on-vehicle device 10 has a function to search music. In the on-vehicle system illustrated in FIG. 1B, as a requirement of the protocol of the smartphone 20, it is required that the music search function be enabled when all the music information has been stored in the on-vehicle device 10 and the music search function be disabled when not all the music information has been stored in the on-vehicle device 10. When the smartphone 20 is connected to the on-vehicle device 10, the on-vehicle device 10 is notified of all the music information by the smartphone 20. The on-vehicle device 10 enables the music search function when all the music information sent has been stored in the embedded storage 12 (S30). When the music search function is enabled, a database for music searching is created on the basis of the music information, and a search screen is displayed on the basis of the database. When the user inputs the selection of a track list from the search screen, the on-vehicle device 10 displays a list of all tracks with reference to the database for music searching (S40).

In the on-vehicle system illustrated in FIG. 1B, after the database for music searching is created on the on-vehicle device 10, music can be promptly searched with reference to the database for music searching without communication with the smartphone 20. However, the embedded storage 12 of the on-vehicle device 10 has a limited capacity. Therefore, depending on the number of pieces of music saved in the smartphone 20 to be connected, not all the music information associated thereto can be stored, resulting in the situation that the music search function cannot be enabled. As a result, user convenience is impaired.

The present invention has been made to overcome the aforementioned conventional problem, and it is an object of the present invention to provide an electronic device, and a method and system for constructing a database that improves user convenience.

An electronic device according to the present disclosure includes a connection means connectable to a mobile terminal storing a plurality of pieces of content and attribute information associated with each of the plurality of pieces of content, an acquisition means for acquiring the attribute information of each piece of content from the mobile terminal when the mobile terminal is connected, a storage means for storing the attribute information acquired by the acquisition means, a search means enabling searching of the content on the basis of the attribute information stored by the storage means, and a control means for controlling the storage means, wherein the control means determines whether free capacity of the storage means is insufficient and, when the control means determines that the free capacity of the storage means is insufficient, removes at least one piece of attribute information associated with the content.

It is preferable that the control means determines that the free capacity is insufficient when detecting that the free capacity of the storage means is a certain level or less. It is preferable that the control means determines whether the free capacity is insufficient on the basis of a progress rate indicating a percentage of acquisition of the attribute information. It is preferable that the control means determines whether the free capacity is insufficient according to a relationship between the progress rate and usage of the storage means. It is preferable that the progress rate is received from the mobile terminal. It is preferable that, when attribute information acquired from a plurality of mobile terminals is stored in the storage means, the control means removes at least one piece of attribute information of each mobile terminal depending on usage of the storage means of the attribute information of each mobile terminal. It is preferable that, when a plurality of pieces of attribute information are associated with one piece of content, the control means removes predetermined attribute information from the plurality of pieces of attribute information. It is preferable that, when a plurality of types of attribute information are associated with one content, the control means removes a type of attribute information with low priority from the plurality of types of attribute information. It is preferable that the priority is preset with respect to each of the plurality of types of attribute information. It is preferable that the priority is set on the basis of use frequency of the plurality of types of attribute information. It is preferable that the attribute information includes at least one of music title, artist's name, album title, genre, composer's name and playlist, and the control means removes at least one piece of information from a particular type of information including artist's name, album title, genre, composer's name, and playlist. It is preferable that the search means creates a search database on the basis of the attribute information. It is preferable that the search means displays a search screen for searching the content on the basis of the search database, and a user is able to search the content through the search screen. It is preferable that, when searching of the content is performed, identification information for identifying the content is output to the mobile terminal. It is preferable that the electronic device further includes an output means for outputting the content transmitted from the mobile terminal in response to search results of the search means.

A method of constructing a database in an electronic device according to the present disclosure includes the steps of connecting a mobile terminal storing a plurality of pieces of content and attribute information associated with each of the plurality of pieces of content, acquiring the attribute information of each piece of content from the mobile terminal, when the acquired attribute information is stored in a storage space, determining whether free capacity of the storage space is insufficient, and when it is determined that the free capacity of the storage space is insufficient, removing at least one piece of attribute information of each content from the storage space, and constructing a database for searching the content on the basis of the attribute information stored in the storage space.

A system according to the present disclosure includes the electronic device configured in the aforementioned manner and at least one mobile terminal that can be connected to the electronic device. The mobile terminal includes a plurality of pieces of content, a storage means for storing the attribute information associated with each of the plurality of pieces of content, a connection means that can be connected to the electronic device, and a provision means for providing the attribute information to the electronic device via the connection means. The mobile terminal preferably includes a transmission means for transmitting content to the electronic device on the basis of the identification information output from the electronic device when the content is searched with the electronic device.

According to the present disclosure, it is determined whether the free capacity of the storage means for storing the attribute information acquired from the mobile terminal is insufficient, and when it is insufficient, part of the attribute information is removed from the storage means. Even when the attribute information retained by the mobile terminal is abundant with respect to the storage capacity of the electronic device, the attribute information of the content can be stored in the storage means to the extent possible. As a result, the function for searching the content of the mobile terminal can be enabled in the electronic device.

BRIEF DESCRIPTION OF THE DRAWINGS

FIG. 1A is a diagram illustrating an example where a smartphone includes a music search function, and FIG. 1B is a diagram illustrating an example where an on-vehicle device includes a music search function;

FIGS. 11A to 11C are diagrams explaining examples of removal of music information according to an example of the present invention;

FIGS. 12A and 12B are diagrams explaining examples of removal of music information according to an example of the present invention;

FIGS. 13A and 13B are diagrams illustrating examples of a music search screen according to an example of the present invention;

FIGS. 18A to 18C are diagrams illustrating examples of removal of a music information removal unit according to the third example.

DETAILED DESCRIPTION OF THE PREFERRED EMBODIMENTS

Next, an embodiment of the present invention is described. A system according to the present disclosure includes an electronic device and at least one mobile terminal that can be connected to the electronic device. The electronic device according to the present invention, in a preferred form, may be an on-vehicle device mounted on a movable object, e.g., a vehicle, or an on-vehicle device that can be brought into the movable object. Furthermore, the electronic device according to the present invention is not particularly limited, but may be a general-purpose computer device or a computer device that includes a particular intended use (e.g., a navigation function, an audio and video reproduction function, or a communication function). The mobile terminal according to the present invention is not particularly limited, but may be a smartphone, a mobile phone, a wearable terminal, a tablet terminal, a portable terminal, or a laptop terminal. The mobile terminal according to the present invention, in a preferred form, includes a function for storing content, e.g., music, and reproducing the stored content.

Examples

Figure 1A:
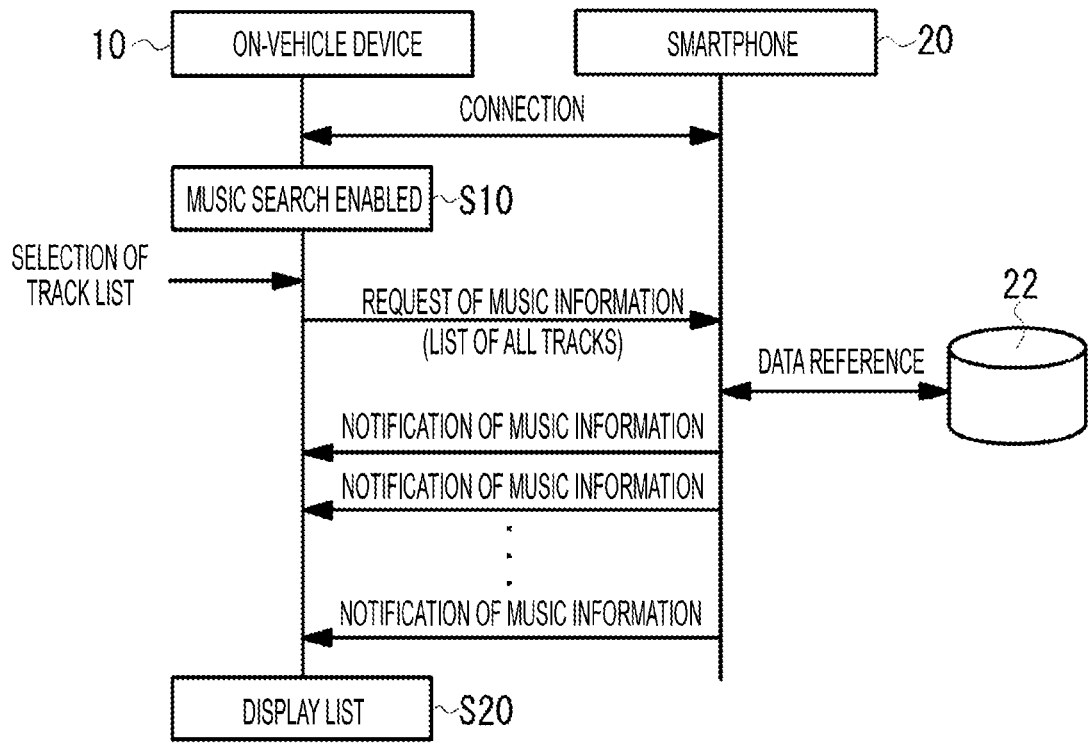
FIGS. 1A and 1B are diagrams illustrating an example of a conventional on-vehicle system.
Figure 1B:
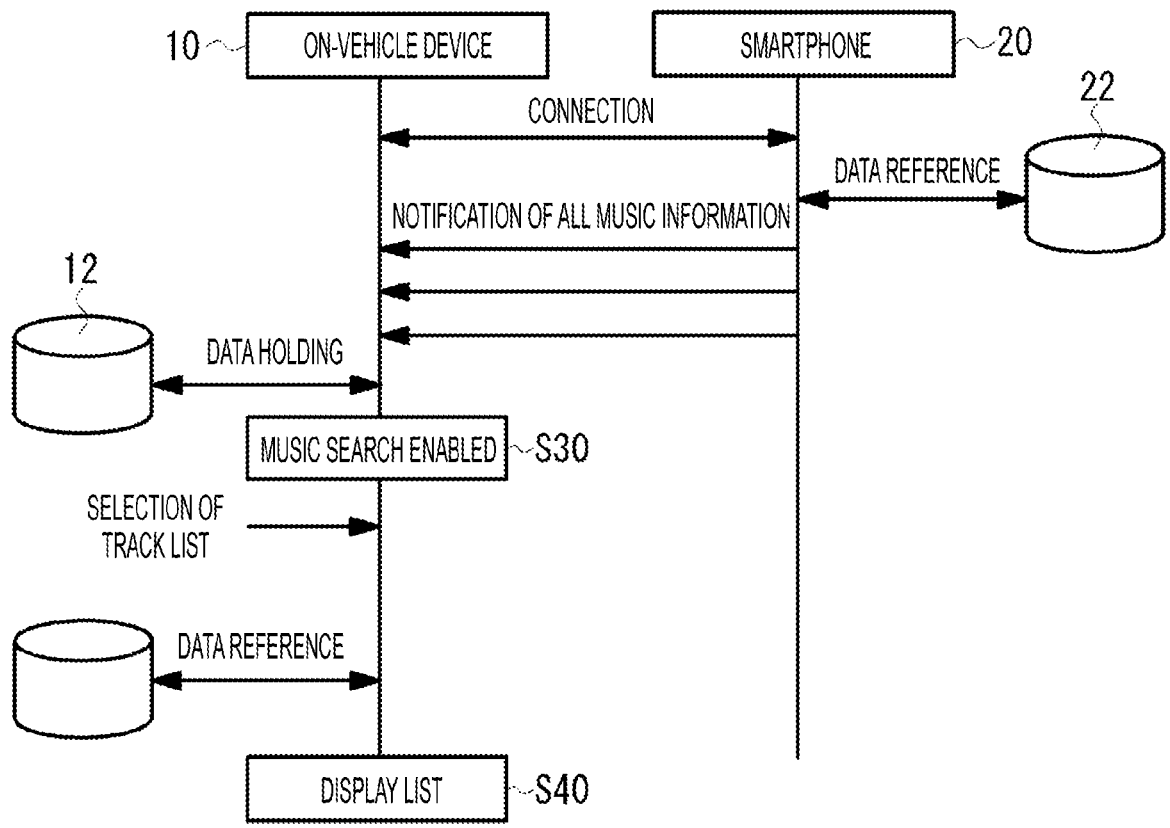
Figure 2:
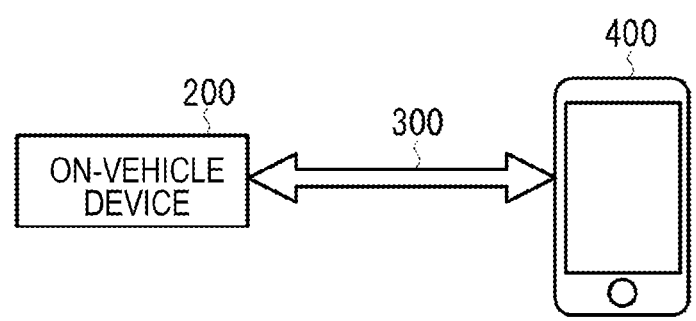
FIG. 2 is a diagram illustrating an example of an on-vehicle system according to an example of the present invention.

FIG. 2 is a diagram illustrating an example of an on-vehicle system according to an example of the present invention. An on-vehicle system 100 according to the present example includes an on-vehicle device 200 and a mobile terminal 400 connected to the on-vehicle device 200 via a connection means 300. The connection means 300 enables bidirectional data communication between the on-vehicle device 200 and the mobile terminal 400 and may be in the form of either a wired connection or a wireless connection. Wireless connection may be, for example, Bluetooth (registered trademark), Wi-Fi (registered trademark), wireless LAN, or other communication means. Wired connection may be USB, FireWire, Thunderbolt, or other communication means.

Figure 3:
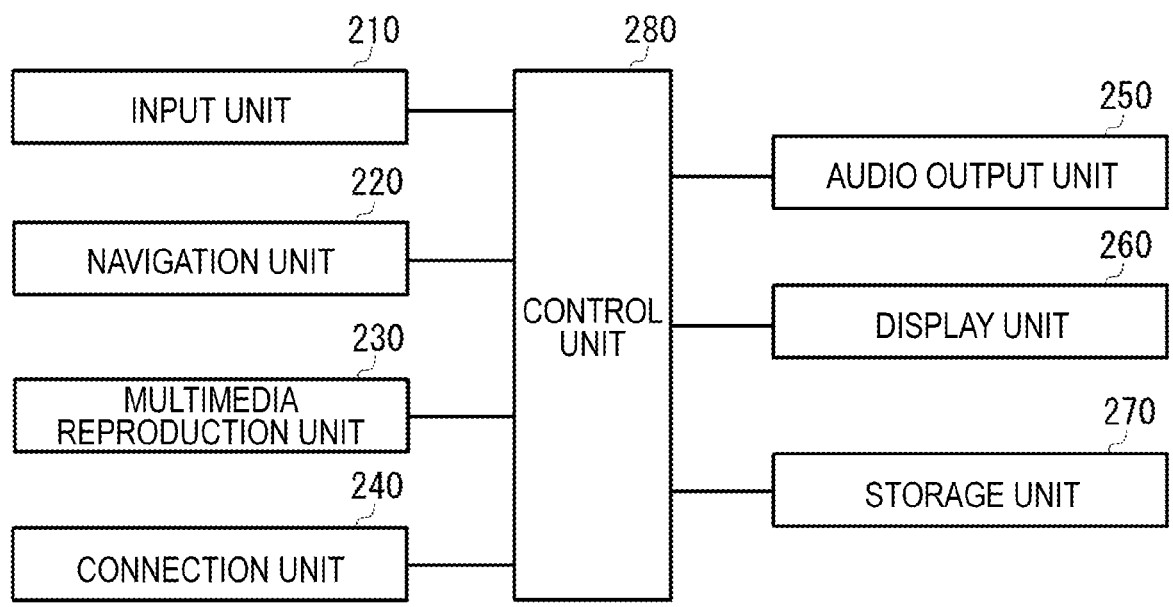
FIG. 3 is a diagram illustrating a configurational example of an on-vehicle device according to an example of the present invention.

FIG. 3 is a block diagram illustrating a typical configuration of the on-vehicle device 200 according to the present example. An input unit 210 receives input from a user and provides it to a control unit 280. The input unit 210 includes a touch panel, an input key device, and/or an audio input module. A navigation unit 220 detects the user's vehicle position on the basis of position information transmitted from a GPS satellite or information from a gyro sensor or acceleration sensor mounted on the vehicle, and performs guiding and searching a route to a destination by displaying a road map around the vehicle position on a display unit 260. A multimedia reproduction unit 230 reproduces video data or audio data recorded on a recording medium, e.g., a DVD, a CD or a Blu-ray disc. The reproduced video data is displayed on the display unit 260, and the audio data is output through an audio output unit 250.

A connection unit 240 configures a connection means 300 illustrated in FIG. 2 and enables data transmission and reception between the on-vehicle device 200 and the mobile terminal 400. FIG. 2 illustrates an example where one mobile terminal 400 is connected. However, multiple mobile terminals 400 may be connected. In this case, the connection unit 240 is connected to the mobile terminals 400 via multiple channels.

The audio output unit 250 outputs audio data reproduced by the multimedia reproduction unit 230 or audio data received from the mobile terminal 400 via the connection unit 240. The display unit 260 outputs image data reproduced by the multimedia reproduction unit 230 or image data received from the mobile terminal 400 via the connection unit 240. A storage unit 270 stores, for example, software executed by the control unit 280, music information transmitted from the mobile terminal 400 when the mobile terminal 400 is connected, map data required by the navigation unit 220, and multimedia data for reproduction by the multimedia reproduction unit 230.

The control unit 280 includes a microprocessor or a microcomputer. The control unit 280 controls units by executing a program or the like stored in a ROM/RAM or in the storage unit 270. In the present example, the control unit 280, when the mobile terminal 400 is connected, executes a program of constructing a database for searching content data stored in the mobile terminal 400. Details of the program are described below.

Figure 4:
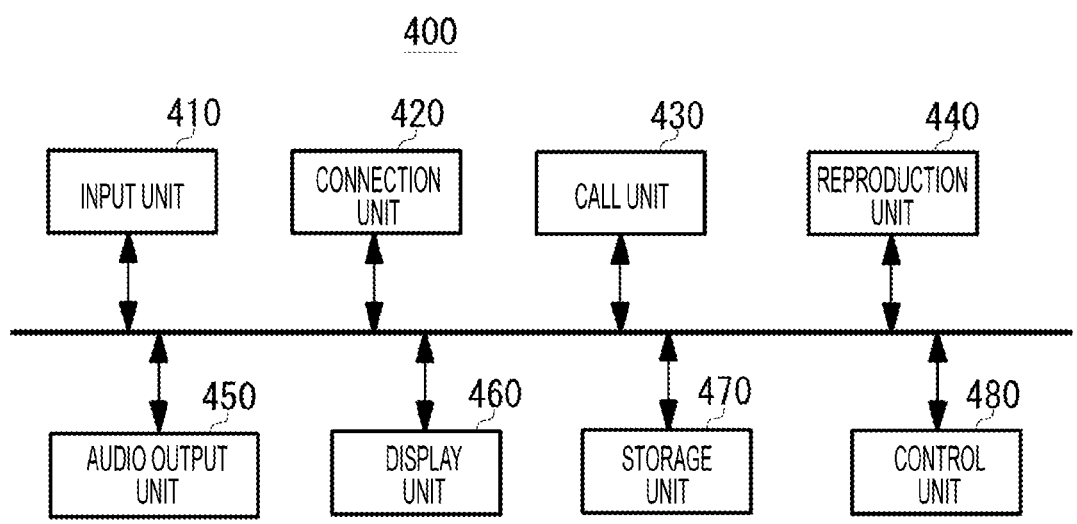
FIG. 4 is a diagram illustrating a typical configurational example of a mobile terminal according to an example of the present invention.

FIG. 4 is a block diagram illustrating a typical configuration of the mobile terminal 400. The mobile terminal 400 includes an input unit 410 for receiving input from a user, a connection unit 420 for enabling connection to the on-vehicle device 200, a call unit 430 for enabling an audio call via a public wireless line, a reproduction unit 440 for reproducing content data stored in a storage unit 470 or content data acquired from the outside, an audio output unit 450 for outputting audio data, a display unit 460 for outputting image data, the storage unit 470 for storing various data and application software or the like, and a control unit 480 for controlling the units.

Figure 5:
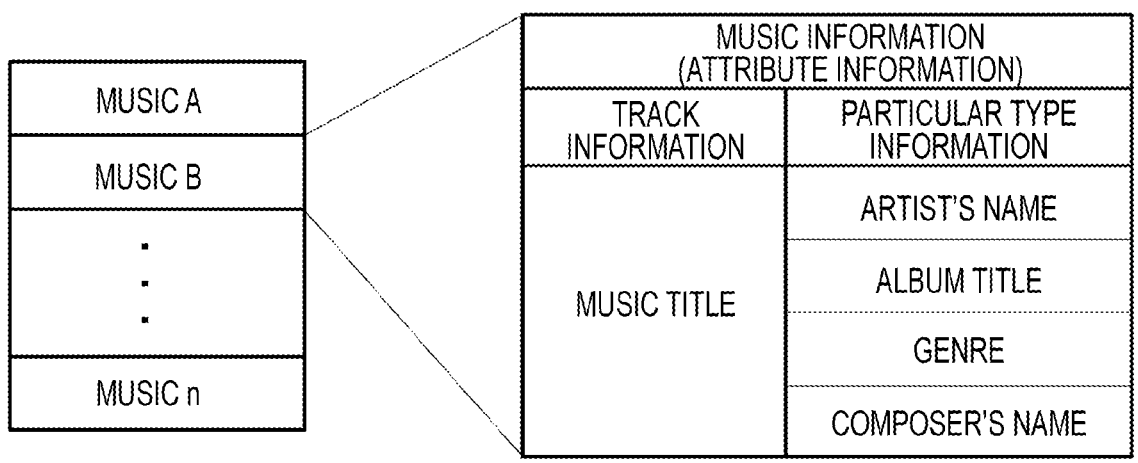
FIG. 5 is a diagram explaining a configurational example of music data of a mobile terminal.

The mobile terminal 400 has a function of reproducing content data stored in the storage unit 470 and outputting it through the audio output unit 450 or the display unit 460 in response to input from a user. The content is, for example, music or a movie. In the following description, music is described as an example of the content. FIG. 5 illustrates a configurational example of music data. When multiple pieces of music A, B, . . . n (n is natural number) are stored in the storage unit 470, with regard to one piece of music, audio data constituting the music and music information (attribute information or meta-information) associated therewith are stored. The example of FIG. 5 exemplifies music information associated with music B. The music information includes track information that includes the music title etc. of music B, and particular types of information that include the artist's name, the album title, the genre, and the composer's name. Furthermore, the music information may include a playlist that specifies the order of music to be reproduced. The music information can be referred to as a search command or search conditions for search of the pieces of music A, B, . . . n.

When the mobile terminal 400 is used alone, the reproduction unit 440 reproduces the audio data of the music read from the storage unit 470. However, when the mobile terminal 400 is connected to the on-vehicle device 200 via the connection means 300, the mobile terminal 400 transmits audio data or image data to the on-vehicle device 200 according to the music searching in the on-vehicle device 200. The on-vehicle device 200 outputs the received audio data or image data through the audio output unit 250 or the display unit 260.

Figure 6:
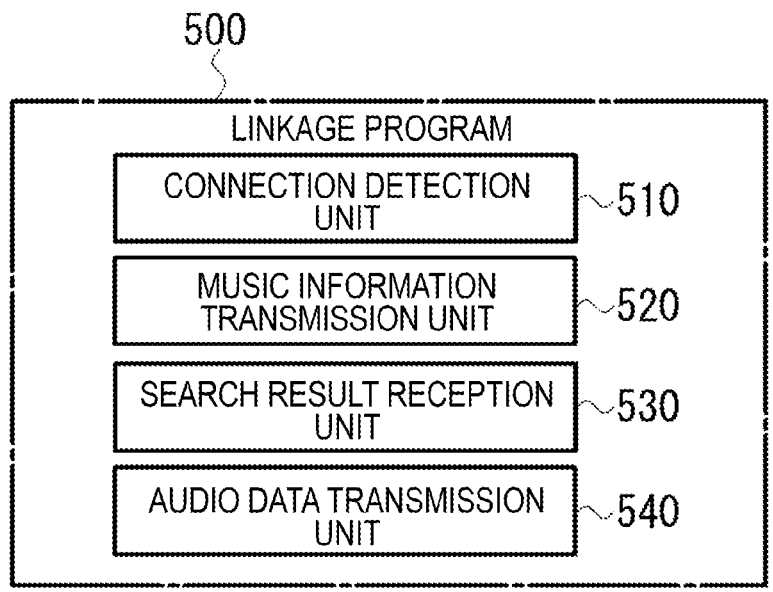
FIG. 6 is a block diagram illustrating a functional configuration of a linkage program of a mobile terminal according to an example of the present invention.

The control unit 480 of the mobile terminal 400, when the on-vehicle device 200 is connected, executes a linkage program to link up with the on-vehicle device 200. FIG. 6 is a block diagram illustrating a functional configuration of a linkage program 500. The linkage program 500 includes a connection detection unit 510 for detecting that the mobile terminal 400 has been connected to the on-vehicle device 200, a music information transmission unit 520 for transmitting the music information of all of the pieces of music A, B, . . . n illustrated in FIG. 5 to the on-vehicle device 200 via the connection unit 420 when the connection is detected by the connection detection unit 510, a search result reception unit 530 for receiving music search results (including identification information of music) from the on-vehicle device 200 when music searching is performed with the on-vehicle device 200, and an audio data transmission unit 540 for selecting music on the basis of the search results received by the search result reception unit 530 and transmitting the audio data of the selected music to the on-vehicle device 200.

Figure 7:
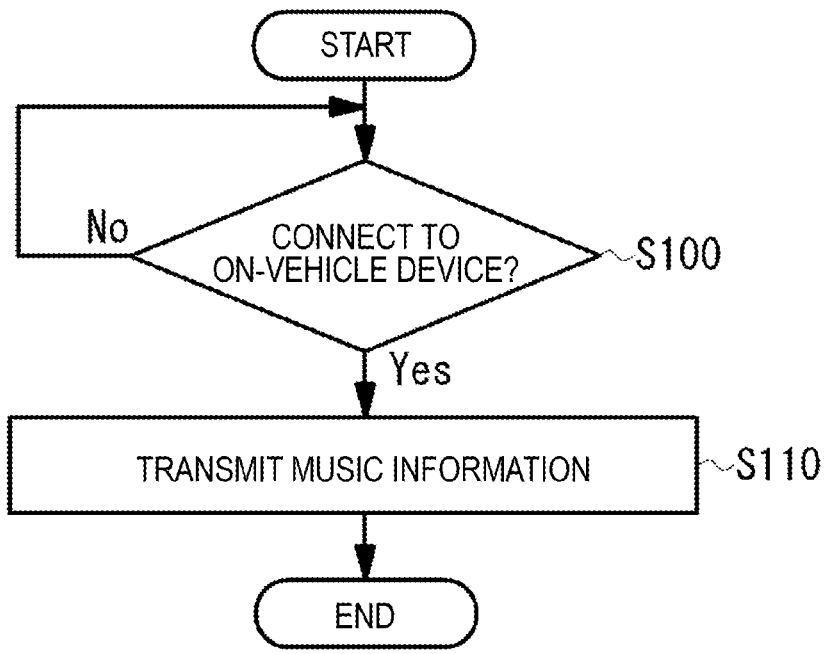
FIG. 7 is a flowchart explaining transmission operation for music information of a mobile terminal according to an example of the present invention.

FIG. 7 is a flowchart illustrating transmission operation for music information with the mobile terminal 400. The connection detection unit 510 detects whether the mobile terminal 400 has been connected to the on-vehicle device 200 (S100). The detection may include authentication or the like of the on-vehicle device 200. For example, when the mobile terminal 400 is connected to the on-vehicle device 200 for the first time, both devices may be paired, or determining whether the authentication information registered in the mobile terminal 400 correspond to the identification information of the on-vehicle device 200 may be included.

When the connection is detected by the connection detection unit 510, the music information transmission unit 520 transmits the music information associated with all of the pieces of music A, B, . . . n stored in the storage unit 470 to the on-vehicle device 200. The music information transmitted to the on-vehicle device 200 is referenced when all of the pieces of music A, B, . . . n of the mobile terminal 400 are searched with the on-vehicle device 200.

Figure 8:
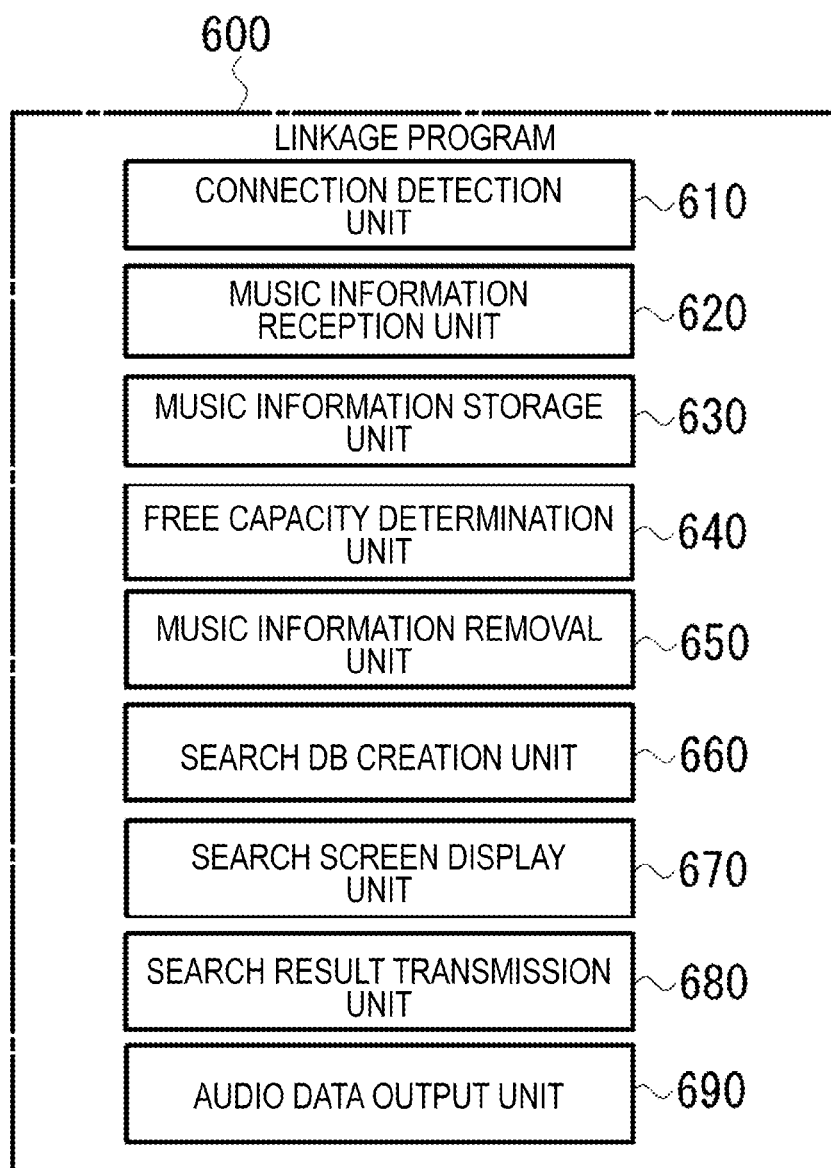
FIG. 8 is a block diagram illustrating a functional configuration of a linkage program of an on-vehicle device according to an example of the present invention.

Next, the linkage of the on-vehicle device 200 with the mobile terminal 400 is described. FIG. 8 is a block diagram illustrating a functional configuration of a linkage program 600 executed by the control unit 280 of the on-vehicle device 200. The linkage program 600 includes a connection detection unit 610 for detecting that the on-vehicle device 200 has been connected to the mobile terminal 400, a music information reception unit 620 for receiving music information transmitted from the music information transmission unit 520 when the connection is detected by the connection detection unit 610, a music information storage unit 630 for storing the music information received by the music information reception unit 620 in the storage unit 270, a free capacity determination unit 640 for determining whether the free capacity of the storage space for storing the music information is insufficient, a music information removal unit 650 for removing part of the music information stored in the storage unit 270 on the basis of determination results of the free capacity determination unit 640, a search DB creation unit 660 for creating a database (DB) for music searching on the basis of the stored music information, a search screen display unit 670 for displaying a search screen on the basis of the search database, a search result transmission unit 680 for transmitting music search results (including identification of music) to the mobile terminal 400, and an audio data output unit 690 for receiving audio data transmitted from the mobile terminal 400 and outputting the audio data through the audio output unit 250.

Figure 9:
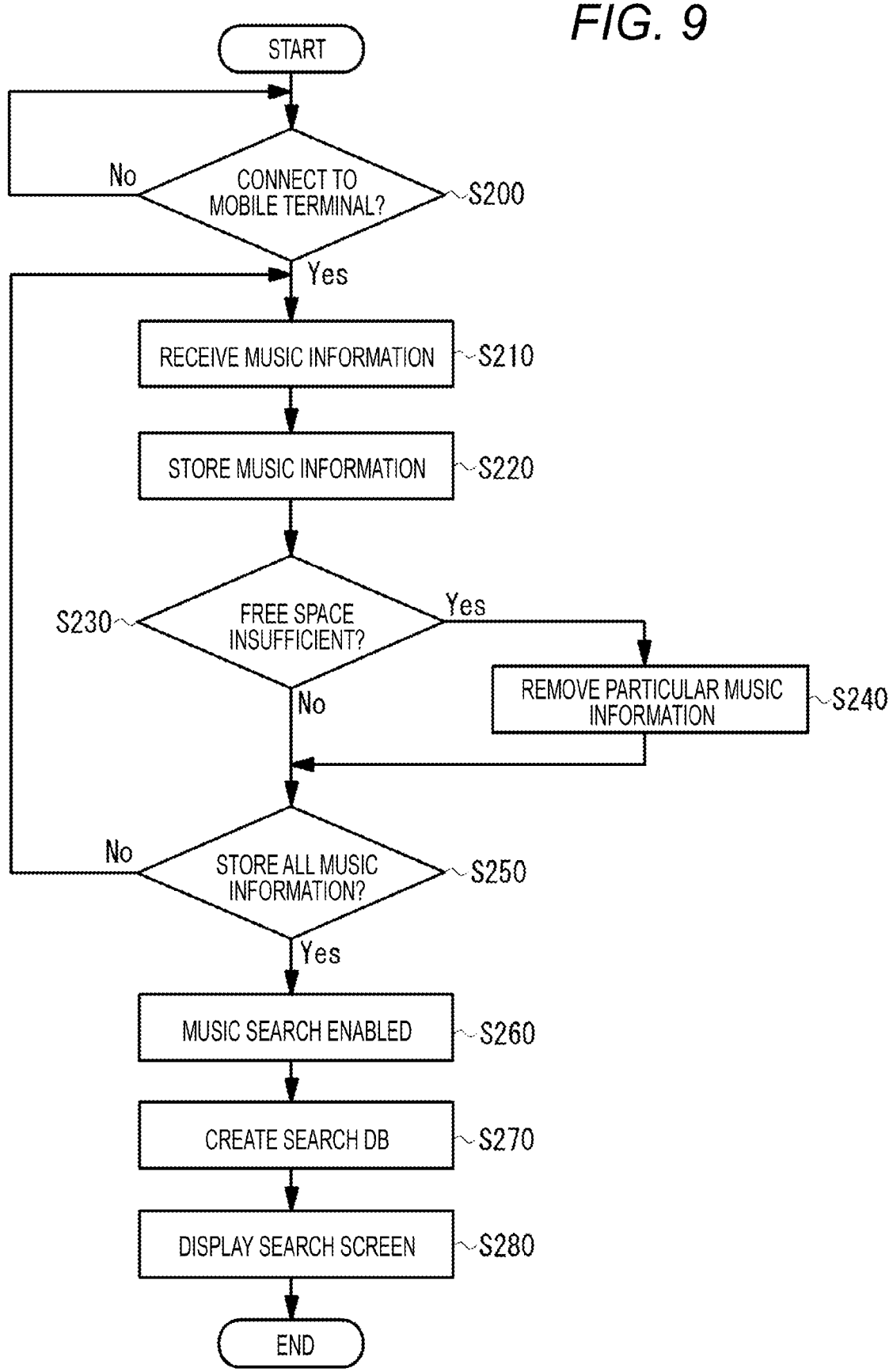
FIG. 9 is a flowchart explaining a storage operation for music information of an on-vehicle device according to an example of the present invention.
Figure 10:
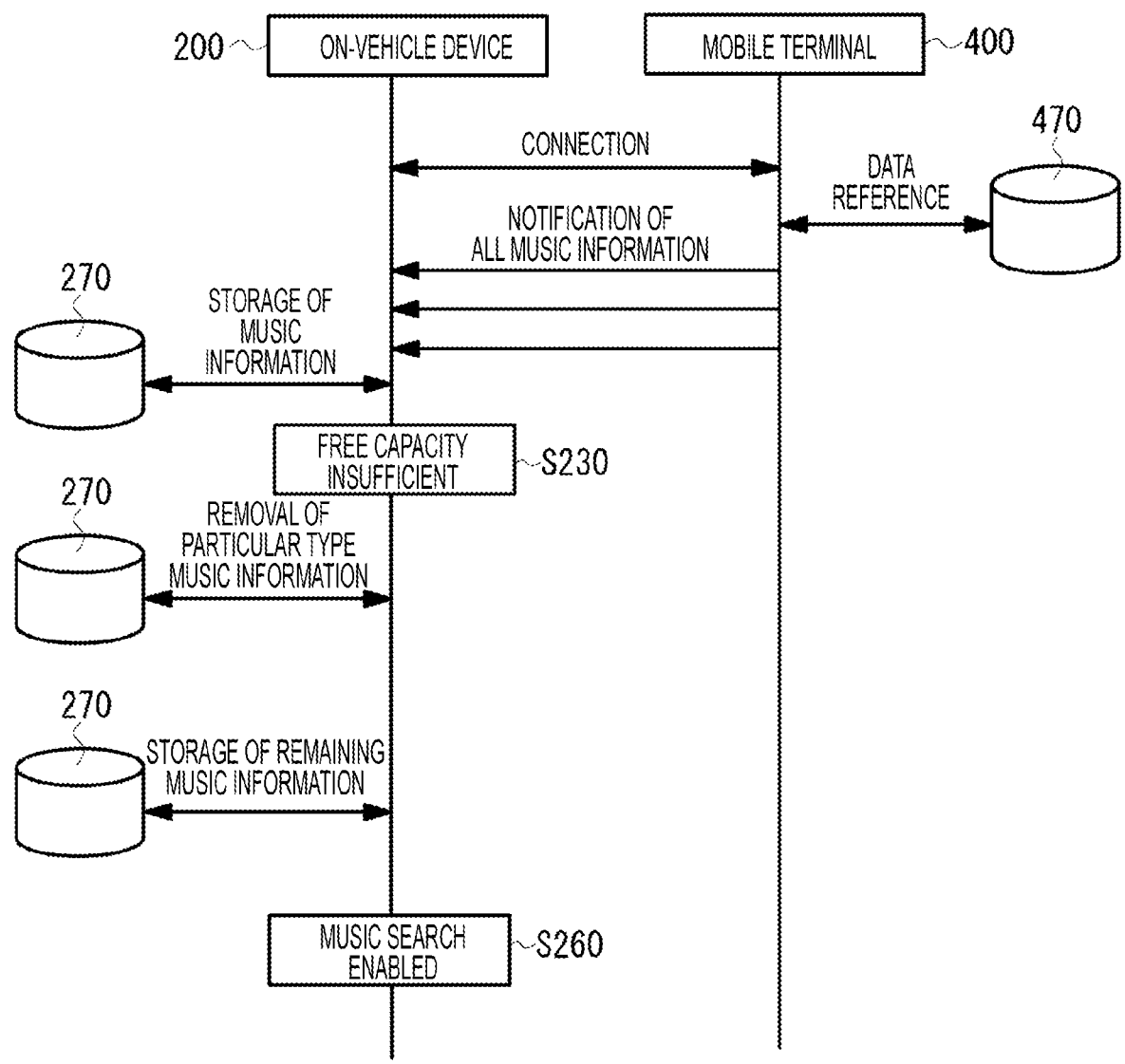
FIG. 10 is a diagram explaining operation of an on-vehicle system according to an example of the present invention.

FIG. 9 illustrates an operation flow of the linkage program 600 of the on-vehicle device 200. FIG. 10 illustrates a flow of data between the on-vehicle device 200 and the mobile terminal 400 in the on-vehicle system.

First, the connection detection unit 610 detects whether the on-vehicle device 200 has been connected to the mobile terminal 400 (S200). The detection may include authentication of the mobile terminal 400. For example, when the mobile terminal 400 is connected to the on-vehicle device 200 for the first time, both devices may be paired, or determining whether the authentication information registered in the on-vehicle device 200 includes the identification information of the mobile terminal 400 may be included.

When the on-vehicle device 200 and the mobile terminal 400 are connected, as described above, the mobile terminal 400 starts transmitting the music information associated with all the stored music, and the music information reception unit 620 receives the music information via the connection unit 240 (S210). According to the example of FIG. 5, the music information associated with the pieces of music A, B, . . . n are received. In one example, the music information reception unit 620 includes a buffer memory and sequentially retains the music information, which is transmitted from the mobile terminal 400, in the buffer memory. The music information storage unit 630 stores the music information, which has been received by the music information reception unit 620, in the storage unit 270 in sequence (S220). When the music information reception unit 620 includes a buffer memory, music information is read out from the buffer memory in sequence and is written in the storage unit 270. The storage unit 270 is preliminarily configured with a storage space for storing music information. The storage space may be an allocated portion of the storage space of the storage unit 270. For example, the storage space of the storage unit 270 may be segmented into multiple partitions, and the music information may be stored in the storage space of one of the partitions.

When the storage of music information starts, the free capacity determination unit 640 monitors the storage space for storing the music information and determines whether the free space is insufficient (S230). While it is continuously determined that the free space is sufficient, the received music information is sequentially stored in the storage unit 270. When it is determined that the free space is insufficient, the music information removal unit 650 removes particular music information from the storage unit 270 (S240) and restores the capacity of the free space. Whether the free space is insufficient is always monitored so that the music information of all the pieces of music can be stored to the extent possible. When the music information of all the pieces of music is stored (S250), the search DB creation unit 660 determines that searching of the music retained by the mobile terminal 400 is enabled (S260). The search DB creation unit 660 creates a search database on the basis of all the stored music information (S270), and the search screen display unit 670 displays the search screen on the display unit 260 on the basis of the search database (S280). The user is able to use the search screen to search music retained in the mobile terminal 400. This searching is performed on the on-vehicle device and does not require communication with the mobile terminal 400.

Next, removal of particular music information is described. FIG. 11A illustrates a configurational example of music information stored in the storage space of the on-vehicle device. Pieces of music information are identified by identification ID#1, ID#2, . . . ID#n. One piece of music information includes track information (music title, etc.) and particular types of information (artist's name, album title, genre, composer's name, playlist, etc.).

The music information removal unit 650 removes at least one piece of information included in the music information when the free space is determined to be insufficient. It can be arbitrarily configured which information to remove. However, in one preferable example, at least one type of information of the particular types of information is removed. Track information (music title) includes information required for identification of music, which is a search result. Therefore, the music information removal unit 650 does not remove the music title. For example, as illustrated in FIG. 11B, "COMPOSER'S NAME", which is a part of the particular types of information, is removed. The music information is used as a search command or search condition for searching music. It is preset such that among the music information, information which is hardly used for music searching is removed. When part of the music information is removed by the music information removal unit 650, the remaining music information to be stored subsequently is stored while the same information is removed therefrom. For example, when "COMPOSER'S NAME" is removed from the storage space, "COMPOSER'S NAME" is not stored when the remaining music information is stored.

Furthermore, the music information removal unit 650 may also remove multiple types of information from the particular types of information. For example, when the free capacity determination unit 640 determines that the free capacity is insufficient and the music information removal unit 650 removes one type of information, in the course of storing the remaining music information, in some cases, the free capacity determination unit 640 again determines that the free capacity is insufficient. In this case, the music information removal unit 650 removes a next type of information and increases the remaining capacity of the free space. When multiple types of information are removed from the particular type of information, it is desirable to preset the order of priority that indicates which type of information to remove preferentially. FIG. 11C illustrates an example where "COMPOSER'S NAME" and "ALBUM TITLE" are removed. In this case, for example, the order of priority is configured such that "COMPOSER'S NAME" is removed first and then "ALBUM TITLE" is removed.

Above, an example where information common to the pieces of music information is removed is indicated. However, the present invention is not limited to the above, but a type of information of the music information with low use frequency may be removed. In this case, the linkage program 600 includes a history retention unit for retaining the history of music information used when the user searches music. The history retention unit retains the history of use of various types of information of the music information, and the music information removal unit 650, when the free capacity is determined to be insufficient, preferentially removes types of information with low use frequency or information that is not used at all. FIG. 12A illustrates an example of the history of use of music information. FIG. 12A illustrates that "Pop", the genre of the music information of ID#1 and ID#4 has been used for searching and composer's names "B" and "C" have been used for searching with regard to music information of ID#2 and ID#3 (hatching). In this case, as illustrated in FIG. 12B, the music information removal unit 650 removes composer's names "A" and "D", which are not used, from the music information of ID#1 and ID#4, and removes "Rock", the genre which is not used, from the music information of ID#2 and ID#3. As such removal is performed, types of information that the user would use are reserved, enabling prevention of a reduction in search convenience.

Next, a method of searching music is described. The search DB creation unit 660, when the music information of all the pieces of music are stored in the music information storage unit 630, creates a search DB for searching music retained in the mobile terminal 400. The search screen display unit 670 creates a search screen on the basis of the created search DB and displays it on the display unit 260. FIGS. 13A and 13B illustrate examples of displaying a search screen. FIG. 13A is an example where all the pieces of music information are stored. The search screen displays, as music information, all the pieces of information including artist's name, album title, music title, genre, composer's name, podcast and playlist, as search items. The user is able to search music by using these search items. FIG. 13B illustrates a search screen where the music information removal unit 650 has removed the types "GENRE" and "COMPOSER'S NAME". On the search screen, neither "GENRE" nor "COMPOSER'S NAME" is displayed or functions as a search command.

When music searching is performed through the search screen, the search results (e.g., track information for identifying music) are transmitted to the mobile terminal 400. The mobile terminal 400 selects music on the basis of the search results and transmits the audio data of the selected music to the on-vehicle device 200. The audio data output unit 690 outputs the audio data through the audio output unit 250.

Figure 14:
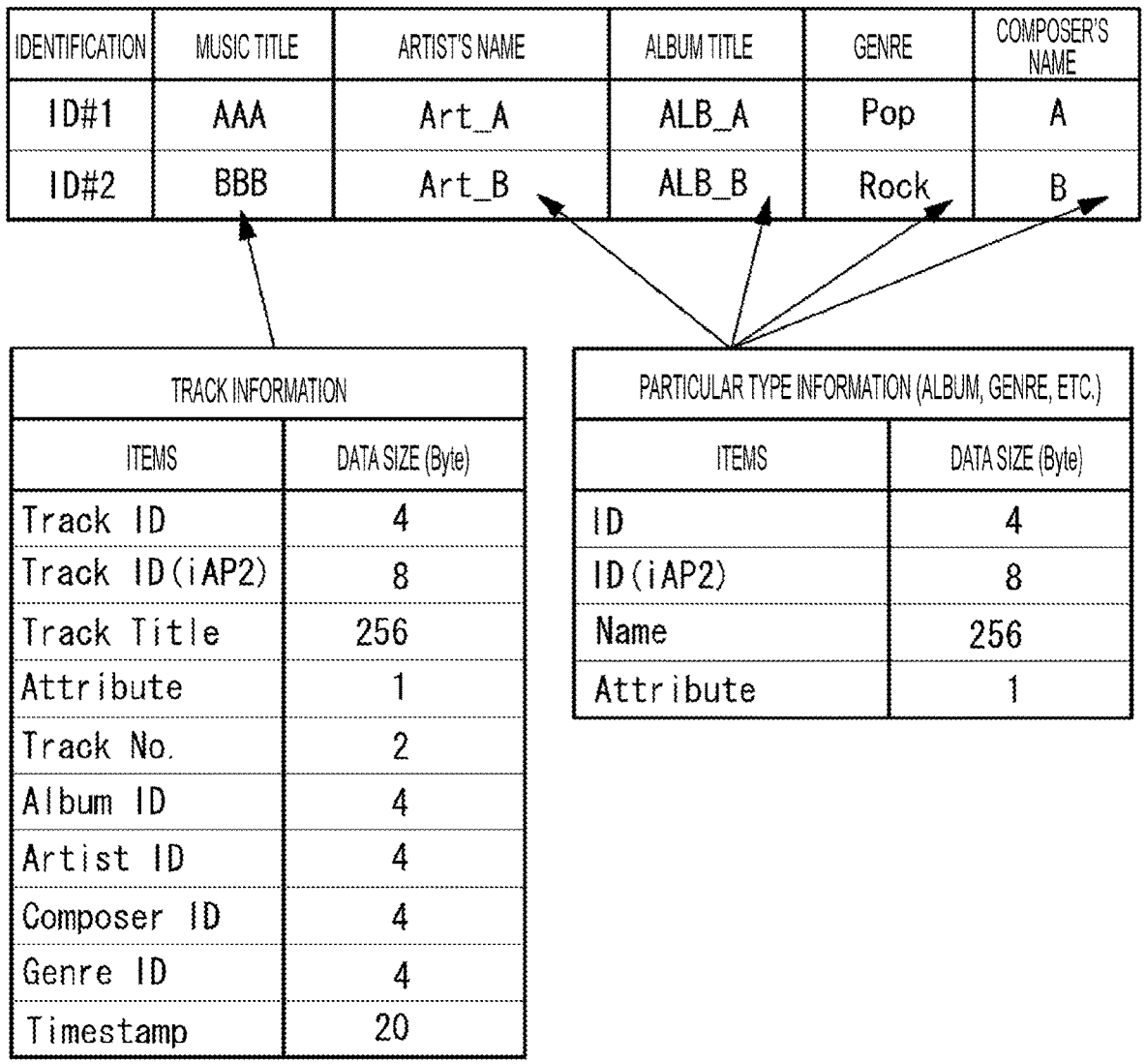
FIG. 14 is a diagram illustrating a data configuration of music information according to an example of the present invention.

Next, an effect of the present example is described. FIG. 14 illustrates a detailed configuration of music information and the data sizes (bytes) of the music information. The music title of music information includes track information. The track information includes a track ID, a track title, an attribute, a track number, album identification, artist identification, composer identification, genre identification, a timestamp or the like. The size of one piece of track information is 307 bytes. Furthermore, the artist's name, the album title, the genre and the composer's name included in the music information are particular types of information. The particular types of information include identification information (ID), name, attribute or the like. The size of one piece of a particular type of information is 269 bytes, and the size of the particular types of information included in one piece of music information is 1,076 bytes.

Assuming, for example, that the mobile terminal 400 retains a total number of 32,000 pieces of music and their album titles do not overlap, the music information is 1,383 bytes/music piece×32,000 pieces of music=about 42 MB/device. In the present example, removal of one piece of particular type of information (e.g., genre) results in 1,114 bytes/music piece×32,000 pieces of music=about 33 MB/device. As a result, an effect of removing a storage space of about 9 MB/device can be obtained. With the specification in which the on-vehicle device 200 retains the music information of six mobile terminals, a storage space of about 54 MB can be removed.

Next, a second example of the present invention is described. In the aforementioned example, part of music information is removed when the free capacity of the storage space is insufficient. However, in the second example, at the time when it is estimated that the remaining storage capacity is insufficient until the completion of DB construction according to the progress rate and the transition of the storage usage of the storage space, part of the music information is removed and the music information is retained in the on-vehicle device as much as possible so that a reduction in user convenience is minimized.

Figure 15:
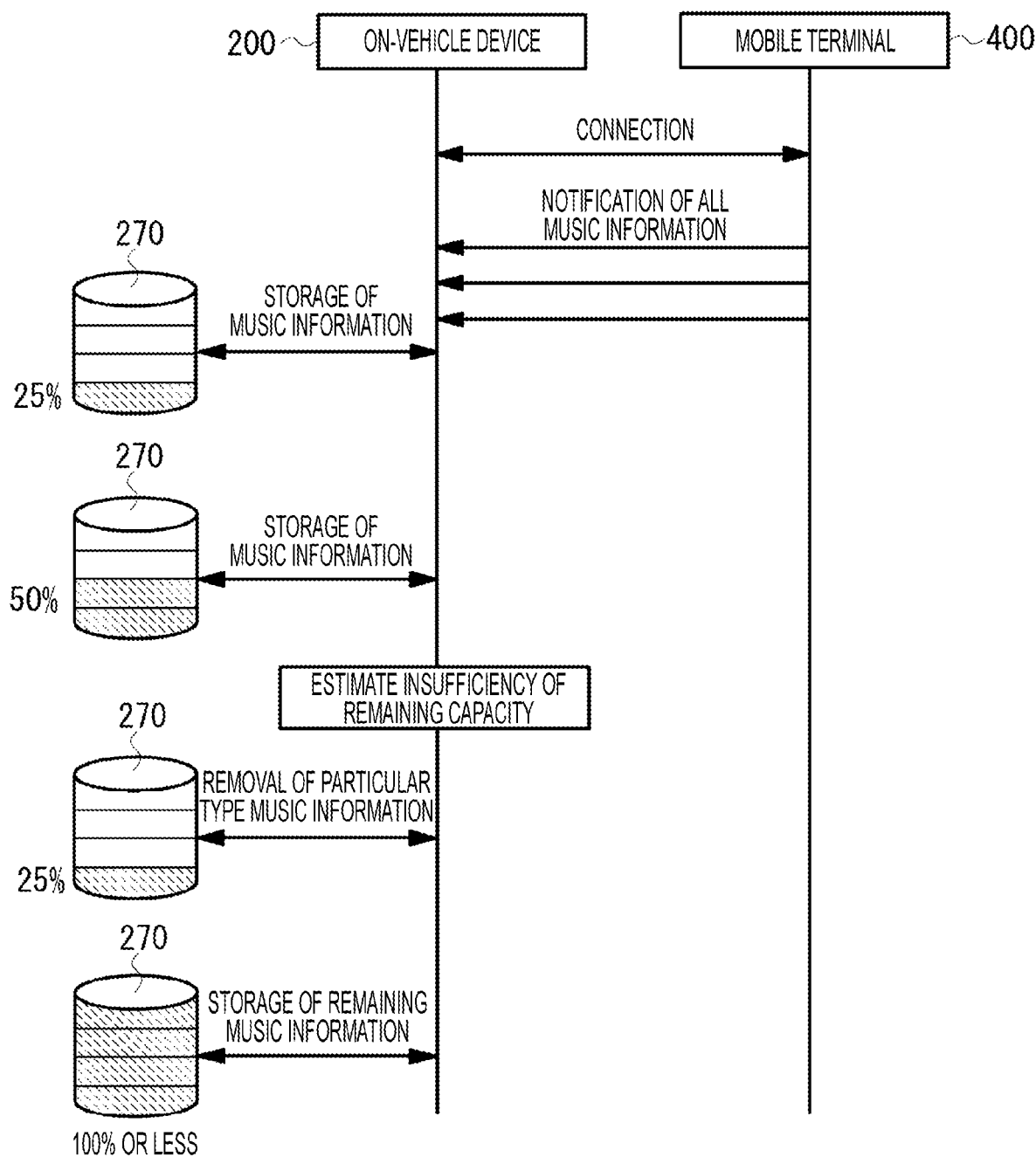
FIG. 15 is a diagram explaining an on-vehicle system according to a second example of the present invention.
Figure 16:
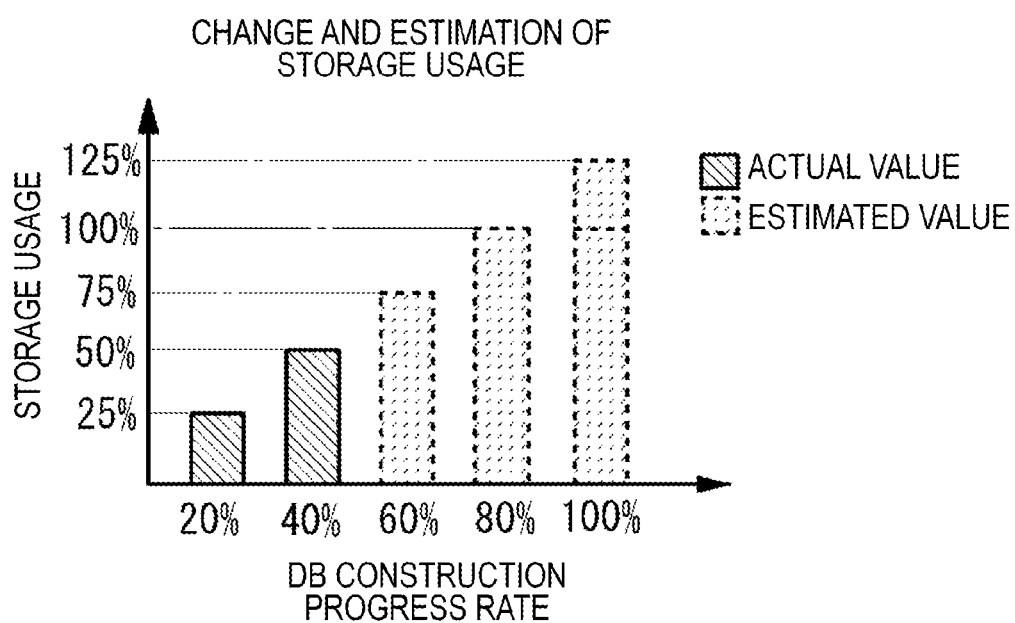
FIG. 16 is a graph explaining a relationship between storage usage and DB construction progress rate.

FIG. 15 is a diagram explaining the second example. The free capacity determination unit 640, when the music information transmitted from the mobile terminal 400 is stored in the storage space of the on-vehicle device 200, estimates whether the free capacity is insufficient on the basis of the progress rate of DB construction and the storage usage. The on-vehicle device 200 is notified of the progress rate by the mobile terminal 400 when the mobile terminal 400 transmits the music information. FIG. 16 is a graph indicating a relationship between the progress rate and the storage usage. The free capacity determination unit 640, when the storage usage is changed to 25% or 50% in cases where the progress rate is 20% or 40%, estimates the storage usage at the time when the progress rate is 100% from the change. An example of FIG. 16 indicates that, when the progress rate reaches 100%, the storage usage is 125% according to an actual value. Therefore, the free capacity determination unit 640, when the progress rate is 100%, estimates that storage space of 25% is insufficient. The music information removal unit 650 removes the music information and increases remaining capacity of 25% so as to store the music information of all the pieces of music on the basis of the above estimation. Thus, the minimum required music information is removed, enabling minimization of a reduction in convenience for music searching.

In the second example, the music information removal unit 650 optimizes the information to be removed from the music information in order to remove the minimum required music information. Specifically, it is not required that the same information be removed from the music information. For example, it may be configured such that the "COMPOSER'S NAME" is removed for certain music information and the "GENRE" and the "COMPOSER'S NAME" are removed for certain music information.

Next, a third example of the present invention is described. In some cases, multiple different mobile terminals are connected to the on-vehicle device 200. The on-vehicle device 200 stores music information of the multiple mobile terminals. In the third example, when the music information of multiple mobile terminals is stored, the amount of music information corresponding to the storage usage of each mobile terminal is removed so that the music information of as many mobile terminals as possible is stored.

Figure 17:
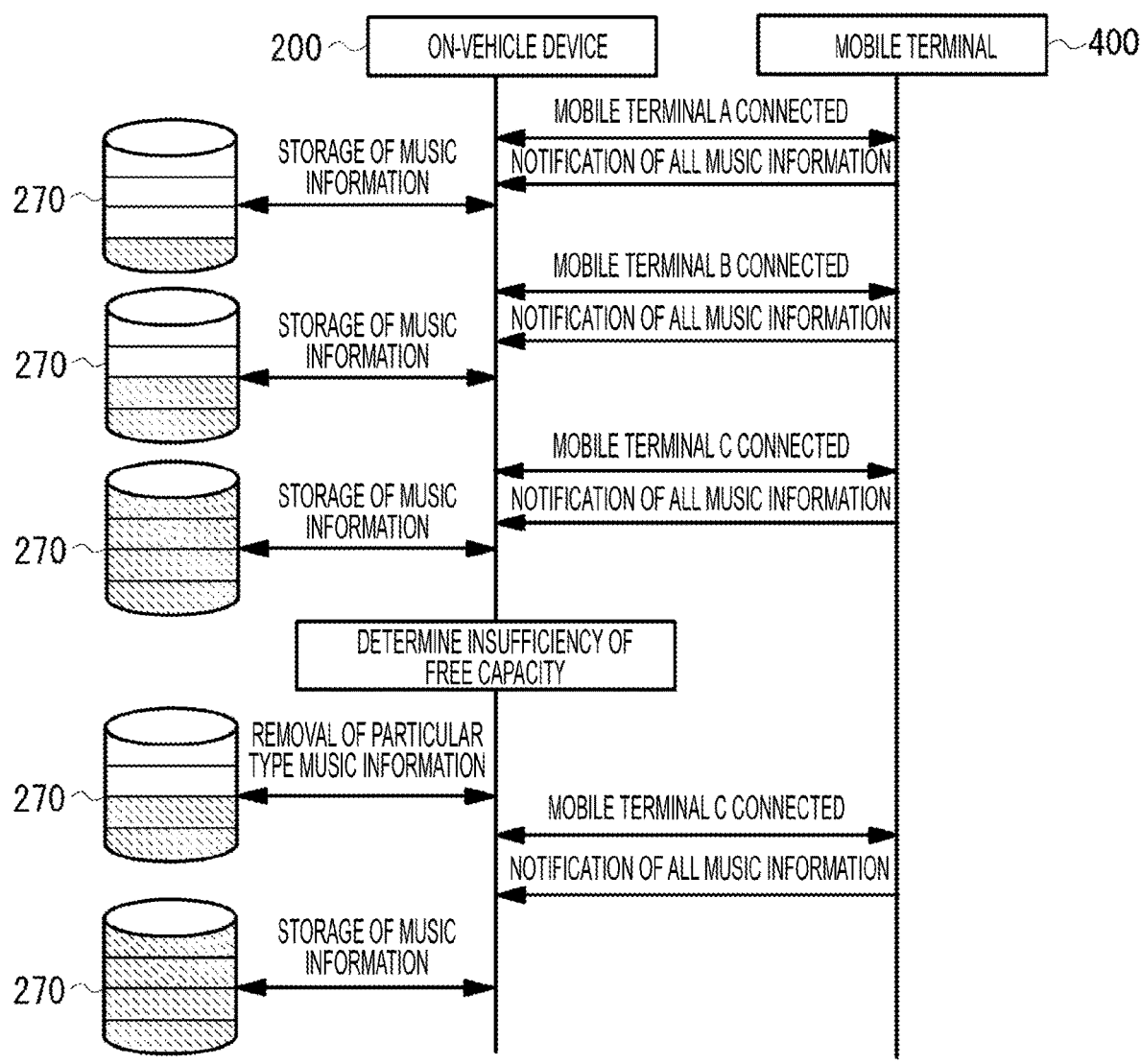
FIG. 17 is a diagram explaining an on-vehicle system according to a third example of the present invention.

FIG. 17 is a diagram explaining the operation of the third example. For example, when mobile terminal A is connected to the on-vehicle device 200, the music information of mobile terminal A is stored in the storage space of the on-vehicle device 200. When another mobile terminal B is connected, the music information of mobile terminal B is stored in the same storage space. The free capacity determination unit 640, when, for example, second and onward mobile terminals are connected, determines whether the free space for storing the music information of another mobile terminal C is insufficient. When it is determined that there is free capacity, the music information removal unit 650 does not remove particular type music information. When mobile terminal C is connected, the music information of mobile terminal C is stored in the same storage space of the on-vehicle device. The free capacity determination unit 640, when a further mobile terminal is connected, determines whether the free space for storing the music information is insufficient. When the free capacity determination unit 640 determines that the free space is insufficient, the music information removal unit 650 removes the music information of mobile terminals A, B and C depending on their storage usages. For example, as illustrated in FIG. 18A, assuming that the sizes of the music information of mobile terminals A, B and C are 10 MB, 15 MB and 20 MB, respectively, the music information removal unit 650 removes the music information, for example, at rates of 10%, 15% and 20%, depending on the usages. Alternatively, as another method, the music information removal unit 650 may remove one piece of particular type of information of mobile terminal A, remove two pieces of particular type of information of mobile terminal B, and remove three pieces of particular type of information of mobile terminal C. Thus, as illustrated in FIG. 18B, the remaining capacity of the storage space is increased, and as illustrated in FIG. 18C, the music information of mobile terminal D can be stored.

In the aforementioned example, music and its music information are exemplified as content. However, the present invention may be similarly applied to information other than music (e.g., image information and attribute information associated therewith).

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:
1. An electronic device comprising:
a connection means connectable to a mobile terminal storing a plurality of pieces of content and attribute information associated with each of the plurality of pieces of content;
an acquisition means for acquiring the attribute information of each piece of content from the mobile terminal when the mobile terminal is connected;
a storage means for storing the attribute information acquired by the acquisition means;
a search means enabling searching of the content on the basis of the attribute information stored by the storage means; and
a control means for controlling the storage means,
wherein the control means determines whether free capacity of the storage means is insufficient and, when the control means determines that the free capacity of the storage means is insufficient, removes at least one piece of attribute information associated with the content.

2. The electronic device according to claim 1, wherein the control means determines that the free capacity is insufficient when detecting that the free capacity of the storage means is a certain level or less.

3. The electronic device according to claim 1, wherein the control means determines whether the free capacity is insufficient on the basis of a progress rate indicating a percentage of acquisition of the attribute information.

4. The electronic device according to claim 3, wherein the control means determines whether the free capacity is insufficient according to a relationship between the progress rate and usage of the storage means.

5. The electronic device according to claim 3, wherein the progress rate is received from the mobile terminal.

6. The electronic device according to claim 1, wherein, when attribute information acquired from a plurality of mobile terminals is stored in the storage means, the control means removes at least one piece of attribute information of each mobile terminal depending on usage of the storage means of the attribute information of each mobile terminal.

7. The electronic device according to claim 1, wherein, when a plurality of pieces of attribute information are associated with one piece of content, the control means removes predetermined attribute information from the plurality of pieces of attribute information.

8. The electronic device according to claim 1, wherein, when a plurality of types of attribute information are associated with one content, the control means removes a type of attribute information with low priority from the plurality of types of attribute information.

9. The electronic device according to claim 8, wherein the priority is preset with respect to each of the plurality of types of attribute information.

10. The electronic device according to claim 8, wherein the priority is set on the basis of use frequency of the plurality of types of attribute information.

11. The electronic device according to claim 1, wherein the attribute information includes at least one of music title, artist's name, album title, genre, composer's name and playlist, and the control means removes at least one piece of information from particular types of information including artist's name, album title, genre, composer's name, and playlist.

12. The electronic device according to claim 1, wherein the search means creates a search database on the basis of the attribute information.

13. The electronic device according to claim 12, wherein the search means displays a search screen for searching the content on the basis of the search database, and a user is able to search the content through the search screen.

14. The electronic device according to claim 13, wherein the search means, when searching of the content is performed, outputs identification information for identifying the content to the mobile terminal.

15. The electronic device according to claim 14, further comprising an output means for outputting the content transmitted from the mobile terminal in response to search results of the search means.

16. A method of constructing a database in an electronic device, the method comprising:
   connecting a mobile terminal storing a plurality of pieces of content and attribute information associated with each of the plurality of pieces of content;
   acquiring the attribute information of each piece of content from the mobile terminal;
   when the acquired attribute information is stored in a storage space, determining whether free capacity of the storage space is insufficient, and when it is determined that the free capacity of the storage space is insufficient, removing at least one piece of attribute information of each content from the storage space; and
   constructing a database for searching the content on the basis of the attribute information stored in the storage space.

17. The construction method according to claim 16, wherein the removal act determines that the free capacity is insufficient when the free capacity of the storage space is a certain level or less.

18. The construction method according to claim 16, wherein the removal act determines whether the free capacity is insufficient on a basis of a progress rate indicating a percentage of acquisition of the attribute information.

* * * * *